May 10, 1949.  A. J. BUTTLER  2,469,591
AIRPLANE CONSTRUCTION
Filed March 28, 1945  2 Sheets-Sheet 1
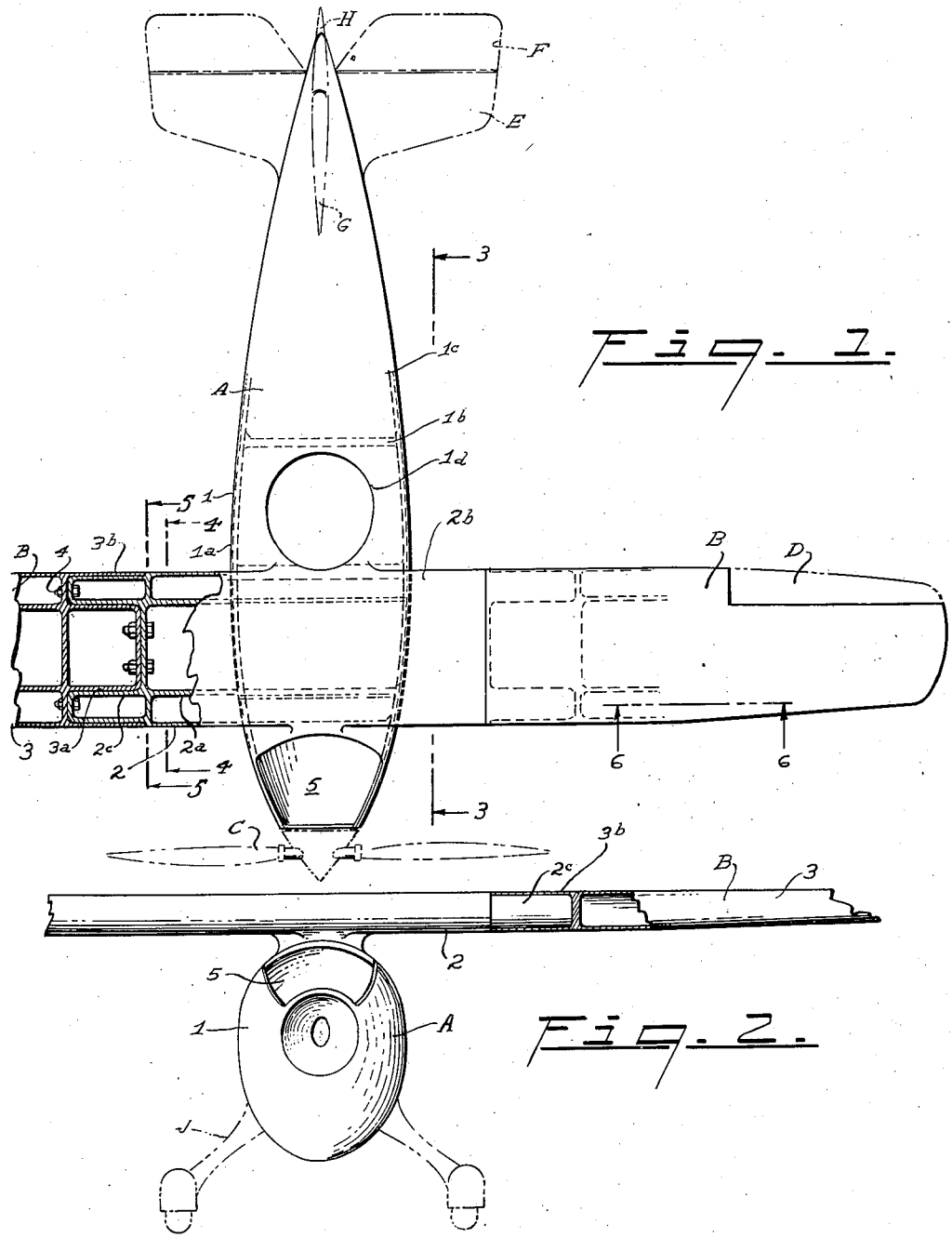
INVENTOR.
BY Allen J. Buttler
William C. Hall
ATTORNEY May 10, 1949.    A. J. BUTTLER    2,469,591
AIRPLANE CONSTRUCTION
Filed March 28, 1945    2 Sheets-Sheet 2
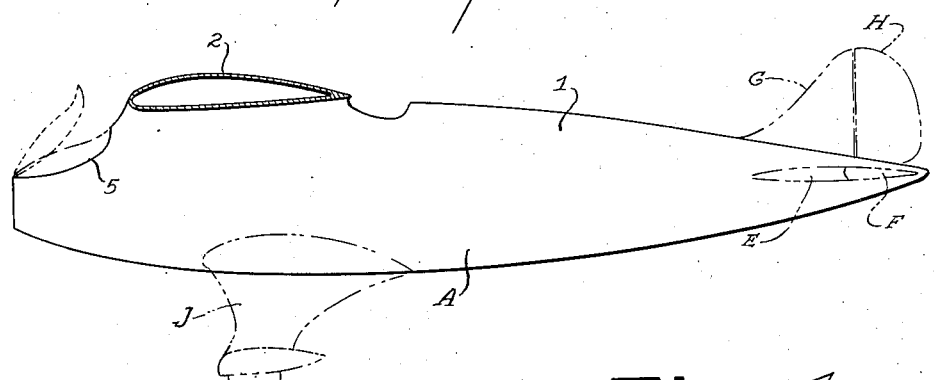
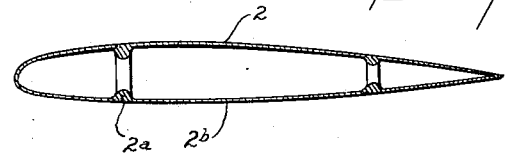
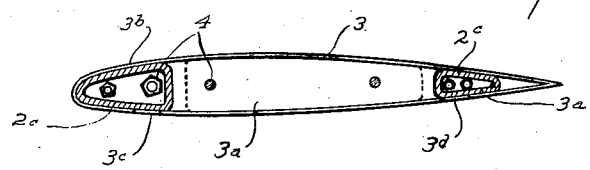
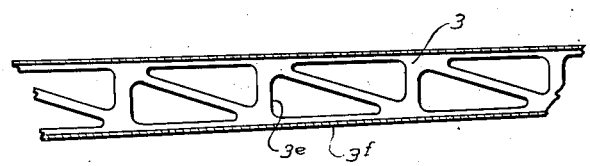
INVENTOR.
Allen J. Buttler
BY William E. Hall
ATTORNEY Patented May 10, 1949

2,469,591

UNITED STATES PATENT OFFICE 2,469,591

AIRPLANE CONSTRUCTION

Allen J. Buttler, Los Angeles, Calif.

Application March 28, 1945, Serial No. 585,211

6 Claims. (Cl. 244—124)

My invention relates to construction of airplanes, and the like.

One of the principal objects of this invention is to provide an airplane or other vehicle which is constructed by separately and completely fabricating various units of the airplane or body and then securing the units together in abutting and interlocking relation, so as to provide not only integral units of structure, but also a structure which, as a whole, is rigid.

A further important object of this invention is to provide an integrally fabricated fuselage and center wing section construction.

A still further important object of this invention is to provide novel means and method of connecting or securing together different longitudinal portions of the wing in overlapping or interlocking position.

Another important object of this invention is to provide an airplane, or other body, which may be economically made in relation to time, material, and weight.

With these and other objects in view, as will appear hereinafter, I have devised a construction for airplanes and other vehicle bodies, as will be hereafter described in detail and particularly set forth in the appended claims, reference being had to the accompanying drawings, and to the characters of reference thereon, which form a part of this application, in which:

Fig. 1 is a plan view of an airplane incorporating my invention, portions thereof being broken away and in section to facilitate the illustration, showing by dot and dash lines certain units to complete the illustration of the airplane;

Fig. 2 is a fragmentary front elevation thereof;

Fig. 3 is a fragmentary side elevation thereof, showing the wing in section, also showing by dot and dash lines certain units to complete the illustration of the airplane;

Figs. 4, 5 and 6 are enlarged fragmentary sectional views thereof, taken respectively through 4—4, 5—5 and 6—6 of Fig. 1.

As shown in the drawings, the fuselage, designated 1 is formed integrally with the center wing section, designated 2, forming a separate unit A. The end wing units B are detachably secured to the ends of the center section 2.

The usual tractor propeller C is provided at the nose of the fuselage.

Ailerons D, horizontal stabilizer E, elevators F, vertical stabilizer G, and rudder H are also provided at the usual locations. These however are integrally molded as complete units.

The under carriage also, which consists of separate wheel brackets J are also separately molded and secured as units to the underside of the fuselage 1.

The fuselage is in usual form, but the longerons $1^a$, ribs $1^b$, and surface cover or skin $1^c$ are cast integrally of metal or plastic material. The center section 2 of the wing also has spars $2^a$, ribs (not shown) and a surface covering or skin $2^b$, which are also cast integrally as a unit. As stated above, this center section 2 is formed integrally with the fuselage 1 by molding or casting the same as a unit.

The ends of the center section have cut-out portions $2^c$ between the entering and trailing edges, and specifically between the spars $2^a$, for receiving tongue or laterally extended portions $3^a$ of wing members 3, designated generally by B. The inner ends of the wing members 3 also have shells $3^b$ which provide the surface covering or skin portions of the inner ends of these wing members and extend around or enclose the tongues $3^a$ of these wing members. These shells also fit over the outer end portions of the center section in which the cut-out portion $2^c$ is provided. Thus, the inner ends of the outer wing members 3 telescope over the outer ends of the center section 2. The center section 2 and the outer wing members 3 are detachably secured together by bolts 4, which, as shown, extend longitudinally of the wing and secure the ends of the tongue to the adjacent rib or wall of the center section, and also secure the ends of the center section at the opposite sides of the cut-out portion $2^c$ to the adjacent rib or wall of the wing member 3. These bolts may be accessible through hand holes $3^c$ and $3^d$, indicated in Fig. 5.

As shown in Fig. 6, the spars of the outer wing members consist preferably of trusswork $3^e$ which are formed integrally with the surface covering or skin portion of the wing.

An opening for the engine hood 5 may be provided at the upper portion of the forward edge of the fuselage. In the fuselage, behind the wing section 2 is provided a cockpit opening $1^d$ which, as shown, is located between transverse ribs $1^b$.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In an airplane, a wing comprising an inner unit and an outer unit, the latter abutting against the former, said units having spaced spars between and substantially parallel to the entering and trailing edges of the units, one of the units having intermediate its spars and intermediate its upper and lower skin surfaces a cut-out portion, the other unit having a middle portion, between the spars, extending laterally beyond the portions located between the spars and the entering and trailing edges, said middle portion extending into the cut-out portion of the former unit.

2. In an airplane, a wing comprising an inner unit and an outer unit, the latter abutting against the former, one of the units having intermediate its entering and trailing edge a cut-out portion, the other unit having a lateral extension extending into the cut-out portion, the adjacent edge of the former unit and the inner end of the cut-out portion thereof having faces abutting corresponding faces at the outer end and base of the lateral extension of the latter unit, and bolts for securing together the units at their abutting faces.

3. In an airplane, a wing comprising an inner unit and an outer unit, the latter abutting against the former, one of the units having intermediate its entering and trailing edge a cut-out portion, the other unit having a lateral extension extending into the cut-out portion, the adacent edge of the former unit and the inner end of the cut-out portion thereof having faces abutting corresponding faces at the outer end and base of the lateral extension of the latter unit, and bolts extending longitudinally of the wing for securing together the units at their abutting faces.

4. In an airplane, a wing comprising an inner unit and an outer unit, the latter abutting against the former, one of the units having intermediate its entering and trailing edge a cut-out portion, the other unit having a lateral extension extending into the cut-out portion, the latter having also a shell extending over the width of the wing and enclosing said lateral extension, said shell telescoping over the adjacent end of the former unit.

5. In an airplane, a wing comprising an inner unit and an outer unit, the latter abutting against the former, said units having spaced spars between and substantially parallel to the entering and trailing edges of the units, one of the units having intermediate its spars a cut-out portion, the other unit having a lateral extension extending into the cut-out portion, the adjacent edge of the former unit and the inner end of the cut-out portion thereof having faces abutting corresponding faces at the outer end and base of the lateral extension of the latter unit, and bolts for securing together the units at their abutting faces.

6. In an airplane, a wing comprising an inner unit and an outer unit, the latter abutting against the former, said units having spaced spars between and substantially parallel to the entering and trailing edges of the units, one of the units having intermediate its spars a cut-out portion, the other unit having a lateral extension extending into the cut-out portion, the latter having also a shell extending over the width of the wing and enclosing said lateral extension, said shell telescoping over the adjacent end of the former unit.

ALLEN J. BUTTLER.

REFERENCES CITED

The following references are of record in the file of this patent:

UNITED STATES PATENTS

| Number | Name | Date |
| --- | --- | --- |
| 1,792,890 | Carns | Feb. 17, 1931 |
| 2,031,662 | Mercier | Feb. 25, 1936 |
| 2,078,544 | Salzman | Apr. 27, 1937 |
| 2,090,038 | Goddard | Aug. 17, 1937 |
| 2,209,564 | Grubb | July 30, 1940 |
| 2,230,393 | Thomson | Feb. 4, 1941 |
| 2,237,329 | Bischof | Apr. 8, 1941 |
| 2,283,223 | Nallinger | May 19, 1942 |
| 2,375,858 | Makaroff | May 15, 1945 |